United States Patent [19]
Petrella

[11] Patent Number: 6,043,290
[45] Date of Patent: Mar. 28, 2000

[54] DIMENSIONAL STABILIZING, CELL OPENING ADDITIVES FOR POLYURETHANE FLEXIBLE FOAMS

[75] Inventor: Robert G. Petrella, Allentown, Pa.

[73] Assignee: Air Products and Chemicals, Inc., Allentown, Pa.

[21] Appl. No.: 09/338,478

[22] Filed: Jun. 22, 1999

[51] Int. Cl.[7] .................................. C08J 9/08; C08J 9/14; C08K 5/09; C08K 5/103; C08K 5/10
[52] U.S. Cl. .......................... 521/130; 521/110; 521/128; 521/129; 521/137; 521/157; 521/170; 521/131
[58] Field of Search .................................... 521/110, 128, 521/129, 130, 137, 157, 170, 131

[56] References Cited

U.S. PATENT DOCUMENTS

| | | | |
|---|---|---|---|
| 4,211,849 | 7/1980 | Kollmeier et al. | 521/164 |
| 4,701,474 | 10/1987 | Bailey, Jr. et al. | 521/137 |
| 4,751,253 | 6/1988 | Tylends | 521/114 |
| 4,785,027 | 11/1988 | Brasington et al. | 521/157 |
| 4,929,646 | 5/1990 | Nichols et al. | 521/137 |
| 5,179,131 | 1/1993 | Wujcik et al. | 521/130 |
| 5,489,618 | 2/1996 | Gerkin | 521/128 |

FOREIGN PATENT DOCUMENTS

| | | |
|---|---|---|
| 471260A | 2/1992 | European Pat. Off. . |
| 98/06673 | 3/1995 | WIPO . |

*Primary Examiner*—Rabon Sergent
*Attorney, Agent, or Firm*—Michael Leach

[57] ABSTRACT

A method for preparing a polyurethane flexible foam by reacting an organic polyisocyanate with a polyol in the presence of urethane catalyst, water as a blowing agent, optionally a silicone surfactant, and a cell opener characterized in that the cell opener comprises the reaction product of a C1–C20 hydrocarbyl group-containing organic acid anhydride and 2,2,4-trimethyl-1,3-pentanediol monoisobutyrate, optionally reacted in the presence of a tertiary amine urethane catalyst.

14 Claims, No Drawings ively. Upon demold, mechanically crushing and breaking the 15
DIMENSIONAL STABILIZING, CELL OPENING ADDITIVES FOR POLYURETHANE FLEXIBLE FOAMS

FIELD OF THE INVENTION

The invention relates to making polyurethane flexible foams using dimensional stabilizer/cell openers.

BACKGROUND OF THE INVENTION

Flexible molded polyurethane foam requires mechanical crushing to open foam cells and prevent shrinkage and to improve dimensional stability of the foam pad. Current mechanical methods for cell opening consist mainly of crushing, vacuum rupture or time pressure release.

Upon demold, mechanically crushing and breaking the polyurethane foam cells enables the polyurethane foam to be more dimensionally stable. Another method of breaking the cells is vacuum crushing which involves drawing a vacuum on the finished polyurethane foam causing cell rupture. The overall effect of these methods is reduced foam shrinkage.

Other mechanical attempts have been made to achieve dimensionally stable foam, such as decreasing cycle production times. For example, demolding the polyurethane foam in three minutes as compared to four minutes will dramatically improve the dimensional stability. However, this can lead to deformation, tearing, or distortion of the polyurethane foam due to undercure.

Another method for producing dimensionally stable foam is time pressure release (TPR). TPR comprises opening the mold during the curing process to release the internal pressure and then reclosing for the duration of the cure time. The sudden release of the internally generated pressure bursts the cell windows, thereby obtaining an open cell foam. The effect of TPR can be varied by performing the TPR at different stages in the curing process, and by varying the length of time the mold is opened before reclosing. This pressure release is performed only once during the cure time of each polyurethane foam. This process may cause corner blowouts, surface defects, and dimensional distortions and, if the defect is severe enough, it will result in scrap polyurethane foam. These discrepancies are considered minor compared to the effect of TPR and its ability to open the foam. Additionally, upon demold the foam must also be subjected to mechanical or vacuum crushing since TPR does not completely provide the necessary energy to totally open cells in the foam.

Mechanical methods usually result in incomplete or inconsistent cell opening and require a flexible molded foam producer to invest in additional machinery. A chemical method for cell opening would be preferred.

U.S. Pat. No. 4,929,646 discloses preparing flexible polyurethane foams using certain high molecular weight, high functionality poly(oxyethylene) compounds as cell openers and softeners.

U.S. Pat. No. 4,751,253 discloses a cell opening, dimensionally stabilizing additive for making flexible polyurethane foam which additive comprises an ester reaction product of a long chain acid with polyethylene or polypropylene glycols and/or contains free acid to provide for desired acid value.

U.S. Pat. No. 4,701,474 discloses the use of acid grafted polyether polyols, such as acrylic acid grafted poly(alkylene oxides), as reactivity controllers in the production of polyurethane foam.

U.S. Pat. No. 4,785,027 discloses preparing polyurethane foams in the presence of polyether mono- or diacids, with the acid functional groups at the ends of the polymer chain. Such polyether acids reportedly delay the initial reaction rate without increasing foam tightness.

U.S. Pat. No. 5,489,618 discloses polyurethane foam prepared in the presence of a salt of a tertiary amine and a carboxylic acid having hydroxyl functionality as a catalyst. Reportedly, the flexible foams produced are more dimensionally stable and have a decreased tendency to shrink.

U.S. Pat. No. 5,179,131 discloses that the addition of mono- or dicarboxylic acids to polyurethane foam formulations made using polyisocyanate polyaddition polymer polyol dispersions (PIPA) results in a reduction of foam shrinkage. Functional groups attached to the acid are either alkyl or alkylene.

U.S. Pat. No. 4,211,849 discloses a process for making open celled, crosslinked foams using as the crosslinker a crystalline polyhydroxy material having at least three hydroxy groups.

EP 471 260A discloses the use of organic acids or their alkali salts for the production of open cell polyurethane foam. It is stated that incorporation of these materials gives foam with markedly lower forced to crush values.

WO 9506673 discloses alkali metal and alkaline earth metal salts of alkyl and alkenyl succinic acids as catalysts for production of polyurethane and/or polyurea foam.

SUMMARY OF THE INVENTION

The invention provides a method for preparing polyurethane flexible foams using certain organic esters as cell stabilizers. The method comprises reacting an organic polyisocyanate and a polyol in the presence of a catalyst composition, a blowing agent, optionally a silicone surfactant cell stabilizer, and as a dimensionally stabilizing, cell opening agent a composition which is the ester reaction product of an organic acid anhydride and 2,2,4-trimethyl-1,3-pentanediol monoisobutyrate.

The use of these ester reaction products in making polyurethane foam provides the following advantages:
- the polyurethane foams (flexible molded and flexible slabstock) manifest reduced shrinkage which provides for improved dimensional stability
- a significant reduction in the force necessary to crush freshly demolded flexible foam without adversely affecting the physical properties of the foam
- the polyurethane cellular structure exhibits a more uniform and consistent gradient within the medium or "bulk" of the polyurethane part For purposes of this invention and as is understood by many in the art, flexible molded foams include microcellular foams such as those used in shoe soles and steering wheels.

DETAILED DESCRIPTION OF THE INVENTION

The ester stabilizer/cell openers used in the preparation of the flexible molded and flexible slabstock foams are the reaction product of an organic acid anhydride and 2,2,4-trimethyl-1,3-pentanediol monoisobutyrate (TPM). The ester reaction product is used in the polyurethane foam composition at levels of 0.05 to 0.5, preferably about 0.2, parts by weight per hundred parts of polyol (pphpp).

The ester reaction product may be expressed by formula I $$X\text{-}Y\text{-}Z \qquad \qquad \text{I}$$

where X represents hydrogen or preferably a saturated or unsaturated hydrocarbon group of 1 to 20 carbon atoms;

Y represents an organic acid anhydride residue carried terminally on the X group and having a free carboxylic acid or carboxylate group; and Z represents a TPM residue linked through its oxygen atom to Y via an ester functionality.

The X group is preferably a saturated or unsaturated aliphatic hydrocarbon chain which has a molecular weight from about 15 to about 281 and especially from about 113 to about 225. Thus, the X group preferably contains at least 8 carbons and up to about 16 carbons and can be linear or branched.

Examples of such groups are nonyl, decyl, decenyl, dodecyl, dodecenyl, hexadecyl, octadecyl, octadecenyl and long alkyl chains such as those obtained for example by the polymerization or copolymerization of mono-olefins containing from 1 to 6 carbon atoms, for example, ethylene, propylene, butene-1, butene-2 or isobutylene.

Preferred X groups are those derived from the polymerization of isobutylene or propylene. These polymers can be made by standard methods and are commonly referred to as alk(en)yl polymers. Such polymers have a terminal double bond that can be reacted with maleic anhydride, for example, to form alk(en)yl substituted succinic anhydride derivatives by reaction in the presence of a standard condensation catalyst, for example a halogen such as bromine, to form a compound of formula II

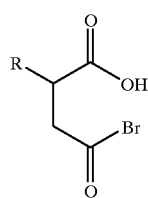

II

The alk(en)yl substituted succinic anhydrides are commercially available and can be used in the form in which they are provided without further purification. Polyisobutylene succinic anhydride is commonly referred to as PIBSA, tetrapropenyl (C12) succinic anhydride (TPSA) is a liquid product consisting of isomers and dodecenyl (C12) succinic anhydride (DDSA) is a solid material essentially free of isomers.

When the Y group is an aromatic anhydride residue, it is preferably derived from phthalic anhydride, and especially phthalic anhydride wherein the X group is attached in the 4-position relative to the anhydride group. It is preferred, however, that the Y group is a succinic anhydride residue derivable from the succinic anhydride group.

When Y is such a group, it is preferably a divalent group of the formulas

—C(O)—CH—CH$_2$—C(O)OH or

HOC(O)—CH—CH$_2$—C(O)—

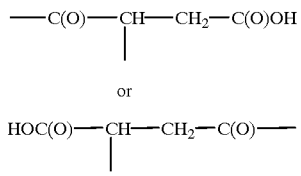

linking the X group to the Z group.

The Z group is the residue of 2,2,4-trimethyl-1,3-pentanediol monoisobutyrate.

Suitable organic acid anhydrides for making the esters include, e.g., maleic anhydride, phthalic anhydride, succinic anhydride and any of the foregoing substituted with a C1–C20, preferably C8–C16, linear or branched hydrocarbyl group such as an alkyl or alkenyl group. For example, the hydrocarbyl group of the succinic anhydride may be polyisobutenyl, dodecenyl or tetrapropenyl. The preferred organic anhydrides are dodecenyl (C12) succinic anhydride (DDSA) and tetrapropenyl (C12) succinic anhydride (TPSA).

The hydroxyl compound for reacting with the anhydrides to form the ester cell openers is 2,2,4-trimethyl-1,3-pentanediol monoisobutyrate which is available from Eastman Chemical Co.

The anhydride and TPM may be reacted in a 1:3 to 3:1 molar ratio, preferably a 1:1 molar ratio. The cell stabilizer/opener can be prepared by adding TPM to the desired anhydride in a reaction vessel at elevated temperatures, e.g., 60–110° C. Agitation of this mixture is required and should be continued until the reaction is completed after several hours. Tertiary amines may be used to catalyze the reaction as is well known in the organic synthesis art. The reaction product can be used as is or the ester can be isolated for use by common purification techniques.

The stabilizer/cell openers according to the invention are employed in the manufacture of polyether and polyester flexible polyurethane foams in the manner known to the art. In producing the polyurethane foams using these cell openers, one or more polyether or polyester polyols are employed for reaction with a polyisocyanate to provide the urethane linkage. Such polyols have an average of typically 2.0 to 3.5 hydroxyl groups per molecule.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanate well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of MDI along with other isomeric and analogous higher polyisocyanates. Also suitable are "prepolymers" of these polyisocyanates comprising a partially prereacted mixture of a polyisocyanate and a polyether or polyester polyol.

Suitable urethane catalysts useful in making polyurethane flexible foams are all those well known to the worker skilled in the art and include tertiary amines, such as triethylenediamine, N-methylimidazole, 1,2-dimethylimidazole, N-methyl morpholine, N-ethyl morpholine, triethylamine, tributylamine, triethanolamine, dimethylethanolamine and bis(dimethylaminoethyl) ether, and organotins such as stannous octoate, stannous acetate, stannous oleate, stannous laurate, dibutyltin dilaurate, and other such tin salts.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, liquid carbon dioxide, CFCs, HCFCs, HFCs, pentane, and the like; especially water or water and HCFC, and cell stabilizers such as silicones.

A general polyurethane flexible molded foam formulation having a 1–3 lb/ft$^3$ (16–48 kg/m$^3$) density (e.g., automotive seating) containing a stabilizer/cell opener according to the invention would comprise the following components in parts by weight (pbw):

| Flexible Foam Formulation | pbw |
|---|---|
| Polyo | 20–100 |
| Polymer Polyol | 80–0 |
| Silicone Surfactant | 1–2.5 |
| Stabilizer/Cell Opener | 0.05–3 |
| Water | 1–8 |
| Auxiliary Blowing Agent | 0–4.5 |
| Crosslinker | 0.5–2 |
| Catalyst Composition | 0.1–5 |
| Isocyanate Index (preferably TDI) | 70–115 |

In the present invention the preferred blowing agent for making the flexible molded foams is water at 1 to 8 parts by wt per hundred polyol (pphp), especially 3 to 6 pphp, optionally with other blowing agents.

Other additives may of course be employed to impart specific properties to the flexible foams. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. It is sometimes convenient to add the stabilizer/cell opener to the reaction mixture as a premixture with one or more of the blowing agent, polyol, water, and catalyst components.

In the Examples the following materials were used:
SA—succinic anhydride (Aldrich Chemicals)
DDSA—dodecenylsuccinic anhydride (Aldrich Chemical)
TPSA—tetrapropenylsuccinic anhydride (Heico Chemical)
PA—phthalic anhydride (Aldrich Chemical)
TPM—2,2,4, trimethyl-1,3-pentanediol monoisobutyrate (Eastman Chemical)
Dabco® DC5043 silicone surfactant (Air Products and Chemicals, Inc.)
Dabco 33-LV® catalyst (Air Products and Chemicals, Inc.)
Dabco® BL-17 catalyst (Air Products and Chemicals, Inc.)
Polycat® catalyst (Air Products and Chemicals, Inc.)

EXAMPLES A–D

Cell Opener A—A three neck one liter reaction flask was set up with a stirrer, an addition funnel, a reflux condenser and a method of providing a nitrogen blanket over the reaction mass. Tetrapropenylsuccinic anhydride (TPSA) (294.8 g; 1.1 moles) was placed in the flask and heated to 100° C. under a nitrogen blanket. 2,2,4 Trimethyl-1,3 pentane-diol monoisobutyrate (216 g; 1.0 moles) was added to the TPSA over an hour with continuous agitation. After the addition was completed, the reacting mass was held at 100° for three hours. The material was cooled to room temperature and removed from the flask.

Cell Opener B—Using the procedure described for making Cell Opener A and slightly modified temperature (70° C. for 3 hours rather than 100° C.), dodecenylsuccinic anhydride (DDSA) (13.3 g; 0.05 moles) was reacted with TPM (10.7 g; 0.10 moles).

Cell Opener C—Using the method described for making Cell Opener A, TDP (216 g; 0.5 moles) was charged to the flask followed by succinic anhydride (SA) (50.2 g; 0.5 moles). The addition was carried out with vigorous agitation to evenly suspend the SA in the TPM. The material was heated to approximately 100° C. over an hour. Agitation and heating was continued for 2 hours after the last of the SA dissolved. The product was cooled to room temperature.

Cell Opener D—Phthalic anhydride (PA) (23.6 g; 0.16 moles) was mixed with TPM (34.4 g; 0.16 moles) and dimethyllaurylamine (41.9 g; 0.2 moles). The mixture was heated in a microwave oven to melt the PA and initiate the reaction. The reacting mass was held at 70° C. for 4 hours.

In the following examples the amount of the cell openers added to the formulations is in pphpp.

Examples 1–8

Cell Openers A–D were evaluated using a standard foam formulation (Formulation A) molded in a 12×12×4 inch (30.5×30.5×10 cm) electrically heated vented mold.

| Formulation | A |
|---|---|
| Conventional Triol 4800 MW | 50 |
| SAN graft polymer polyol | 50 |
| Dabco ® DC5043 | 1.5 |
| Diethanolamine | 1.4 |
| Water (deionized) | 3.6 |
| Dabco ® 33-LV | 0.15 |
| Dabco BL-17 | 0.20 |
| Polycat ® 77 | 0.15 |
| TDI, index | 100 |

The polyols were preblended to form a homogeneous mixture and the silicone surfactant and Cell Opener were added to the preblend. A second blend of diethanolamine, water and the amine catalysts was then added. The mold (155° F.; 68° C.) was sprayed with a solvent based release agent. The TDI was added to the polyol blend and mixed for 5 seconds. Pouring was continued until 14 seconds after the start of mixing. The mold was closed. At the end of 3.5 minutes, the foam pad was removed from the mold, weighed and placed in a Force-To-Crush (FTC) apparatus. This device mimics the ASTM D-3574, Indentation Force Deflection Test, and provides a numerical value of freshly demolded foam's initial hardness or softness. Forty-five seconds after demold the first compression cycle was started. (Although ten compression cycles were performed, only the data for the first three are reported in the tables.) The initial value is reported as the FTC value for the foam; the lower the FTC values the more open the foam. Additionally, the lower the FTC value; the less dimensional distortion is observed on the cured pad. The results of the evaluation are shown on the following tables.

TABLE 1

| Example | 1 | 2 | 3 | 4 | 5 |
|---|---|---|---|---|---|
| Formulation | A | A | A | A | A |
| Cell Opener | none | | | | |
| A | | 0.2 | | | |
| C | | | 0.2 | | |
| TPM | | | | 0.2 | |
| TPSA | | | | | 0.2 |
| FTC (lb/N) | | | | | |
| 1 | 140/624 | 58/259 | 90/401 | 128/571 | 116/517 |
| 2 | 84/375 | 30/134 | 44/178 | 71/317 | 62/277 |
| 3 | 56/250 | 26/116 | 33/147 | 53/236 | 44/196 |

The FTC results in Table 1 show Cell Opener A afforded a 59% reduction in the force necessary to compress the foam. That is an excellent cell opening response. Cell Opener C which is the reaction product of TPM and DDSA, the dodecenyl substituted succinic anhydride, gave a 36% reduction in force, a substantial reduction in force necessary to compress the foam but not as good as that obtained from Cell Opener A.

The cell opening effect of the TPM and TPSA components used to make Cell Opener A were evaluated for cell opening effects with the results also reported in Table 1.

Example 4 shows that TPM produces a slight reduction of cell opening effect of approximately 16%, well below its reaction product with TPSA, namely Cell Opener A which produced a 59% reduction. Example 5 shows TPSA gave a FTC reduction of 17%, again well below the 59% of Cell Opener A. Thus, it can be concluded the ester reaction product is a far more efficient cell opener than either of its components.

Foams were made a couple of days later than the first set using Cell Openers B and D, and as sometimes happens, the control foam was more open than other times. Table 2 presents the results. Cell Opener B, which is similar to Cell Opener A in that the succinic anhydride had a 12 carbon substituent, produced a 50% reduction in FTC value when compared to the control of Example 6.

TABLE 2

| Example | 6 | 7 | 8 |
|---|---|---|---|
| Formulation | A | A | A |
| Cell Opener | none | | |
| B | | 0.2 | |
| D | | | 0.2 |

TABLE 2-continued

| Example | 6 | 7 | 8 |
|---|---|---|---|
| FTC (lb/N) | | | |
| 1 | 84/375 | 42/187 | 24/107 |
| 2 | 36/161 | 22/98 | 19/85 |
| 3 | 25/112 | 21/34 | 19/85 |

Cell Opener D which was the ester reaction product of phthalic anhydride and TPM was also a very potent cell opener producing a FTC reduction of 71% compared to the Example 6 control.

STATEMENT OF INDUSTRIAL APPLICATION

The invention affords a method for making water blown polyurethane flexible foams with improved cell opening.

I claim:

1. In a method for preparing a polyurethane flexible foam which comprises reacting an organic polyisocyanate with a polyol in the presence of urethane catalyst, a blowing agent, optionally a silicone surfactant cell stabilizer, and a cell opener, the improvement which comprises as the cell opener the ester reaction product of an organic acid anhydride and 2,2,4-trimethyl-1,3-pentanediol monoisobutyrate.

2. The method of claim 1 in which the organic acid anhydride is maleic anhydride, phthalic anhydride, succinic anhydride or succinic anhydride substituted with a C1–C20 hydrocarbyl group.

3. The method of claim 1 in which the organic acid anhydride is succinic anhydride substituted with a C8–C16 hydrocarbyl group.

4. The method of claim 1 in which the anhydride is phthalic anhydride.

5. The method of claim 1 in which the anhydride is succinic anhydride.

6. The method of claim 1 in which the anhydride is dodecenylsuccinic anhydride.

7. The method of claim 1 in which the anhydride is tetrapropenylsuccinic anhydride.

8. The method of claim 1 in which the an hydride and the 2,2,4-trimethyl-1,3-pentanediol monoisobutyrate are reacted in the presence of a tertiary amine.

9. The method of claim 1 in which the blowing agent comprises water or water and HCFC.

10. The method of claim 2 in which the blowing agent comprises water or water and HCFC.

11. In a method for preparing a polyurethane flexible foam which comprises reacting an organic polyisocyanate with a polyol in the presence of urethane catalyst, a blowing agent comprising water or water and HCFC, optionally a silicone surfactant cell stabilizer, and a cell opener, the improvement which comprises as the cell opener the reaction product of a C1–C20 hydrocarbyl substituted succinic acid anhydride and 2,2,4-trimethyl-1,3-pentanediol monoisobutyrate, optionally reacted in the presence of a tertiary amine urethane catalyst.

12. The method of claim 11 in which the hydrocarbyl group of the succinic acid anhydride is a C8–C16 hydrocarbyl group.

13. A polyurethane flexible foam composition comprising the following components in parts by weight (pbw):

| | |
|---|---|
| Polyol | 20–100 |
| Polymer Polyol | 80–0 |
| Silicone Surfactant | 1–2.5 |
| Stabilizer/Cell Opener | 0.05–3 |
| Water | 1–8 |
| Auxiliary Blowing Agent | 0–4.5 |
| Crosslinker | 0.5–2 |
| Catalyst Composition | 0.1–5 |
| Isocyanate Index | 70–115 | the stabilizer/cell opener comprising the ester reaction product of an organic acid anhydride and 2,2,4-trimethyl-1,3-pentanediol monoisobutyrate.

14. The flexible foam composition of claim 13 in which the stabilizer/cell opener comprises the reaction product of a C1–C20 hydrocarbyl substituted succinic acid anhydride and 2,2,4-trimethyl-1,3-pentanediol monoisobutyrate, optionally reacted in the presence of a tertiary amine urethane catalyst.

* * * * *